United States Patent
Demianenko et al.

(10) Patent No.: US 6,811,221 B2
(45) Date of Patent: Nov. 2, 2004

(54) CANTILEVER SUPPORTED HEIGHT ADJUSTABLE HEADREST

(75) Inventors: Michael S. Demianenko, Canton, MI (US); Steve B. Livesey, Walled Lake, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 10/287,887

(22) Filed: Nov. 4, 2002

(65) Prior Publication Data

US 2004/0084947 A1 May 6, 2004

(51) Int. Cl.[7] .................................................. A47C 7/36
(52) U.S. Cl. ...................................... 297/391; 297/410

(56) References Cited

U.S. PATENT DOCUMENTS

| | | | | |
|---|---|---|---|---|
| 4,423,905 A | * | 1/1984 | Ray | 297/391 |
| 4,427,233 A | * | 1/1984 | Matumoto | 297/391 |
| 4,576,413 A | * | 3/1986 | Hatta | 297/408 |
| 4,639,041 A | * | 1/1987 | Furukawa | 297/391 |
| 4,854,642 A | * | 8/1989 | Vidwans et al. | 297/10 |
| 5,131,720 A | | 7/1992 | Nemoto | |
| 5,445,434 A | * | 8/1995 | Kohut | 297/391 |
| 5,704,685 A | | 1/1998 | Handa et al. | |
| 5,778,250 A | * | 7/1998 | Master et al. | 297/410 |
| 5,816,658 A | * | 10/1998 | Wallis | 297/410 |
| 5,895,094 A | * | 4/1999 | Mori et al. | 297/410 |
| 6,062,645 A | * | 5/2000 | Russell | 297/410 |

FOREIGN PATENT DOCUMENTS

| | | | | |
|---|---|---|---|---|
| DE | 0267503 A2 | * | 10/1987 | B60N/1/06 |
| DE | 38 21 366 C1 | | 7/1989 | |
| EP | 0 895 895 A1 | | 2/1999 | |
| FR | 0092472 A1 | * | 4/1983 | B60N/1/06 |
| GB | 2 260 696 A | | 4/1993 | |

OTHER PUBLICATIONS

International Search Report; International application No. PCT/US/ 03/34609; mailed Apr. 16, 2004; 3 pp.

* cited by examiner

Primary Examiner—Peter M. Cuomo
Assistant Examiner—S. D'Adamo
(74) Attorney, Agent, or Firm—Foley & Lardner LLP

(57) ABSTRACT

A cantilever supported headrest for use in a vehicle seat such as in the center occupant position in a non-first row application of a vehicle including a split seat back. The cantilever supported headrest includes a two-piece headrest support frame having a flange for connection to a square shaped tube end. The other end of the tube has a passage therein for receiving an anti-rotation bracket including an anti-rotation sleeve. A support bracket connecting the tube to a seat back frame includes a pair of aligned passages having the tube passing there through and the tube includes a plurality of notches for engagement with a height adjustment structure.

10 Claims, 5 Drawing Sheets

CANTILEVER SUPPORTED HEIGHT ADJUSTABLE HEADREST

FIELD OF THE INVENTION

The present invention relates generally to the field of automotive seats and more particularly the present invention relates to a cantilevered headrest for use on an automotive seat such as a second or third row split bench seat.

BACKGROUND OF THE INVENTION

Head restraints or headrests for automotive seats are well known as is the provision of head restraints for a rear seat of a vehicle such as in a second or third row seat. Typically, in a second row of a vehicle, there is a bench seat which may alternatively be split using some given proportion such as 50-50 or 60-40, for example. Since it is common to accommodate three passengers in a split bench seat, the provision of a headrest for the center occupant position is troublesome. There is difficulty due to the conflict between providing a headrest in a center occupant position versus the ability to fold down the split back rest without removing the center headrest.

Additionally, in some countries, safety regulations will mandate a head restraint for all occupants in the vehicle, including the non-first row, center occupant and including split seats. Accordingly, there is a need to develop center position occupant headrests and, in particular, to develop headrests which will allow a split seat back to be folded without requiring the need to remove or alter the headrest.

One known solution to the above problem is to provide the center occupant with a standard headrest capable of normal operation and support for the center occupant. This type of device uses two support posts for anchoring and supporting the headrest. However, the two support post solution is troublesome when considering that the seat back is split. A two post headrest support would likely require one support post positioned in one seat back and the other post positioned in the other seat back. In order to operate the split seat back and fold down one side, it is necessary to remove the headrest prior to folding down either of the split seat backs.

It is also known to have a cantilevered head restraint wherein the head restraint is incorporated into a structural support member such as the seat back support member of a seat back frame of an integrated safety-belt seat ("ISS", also known as all belts to seat or "ABTS") support. Commonly, this solution is used in front row applications due the significant additional expense of such an ISS seat but may also be used in non-first row applications. However, as a practical matter, it is not feasible to have three ISS seats in a non-first row application since the middle position does not have a structural support member such as the seat back support member of a seat back frame. Today's vehicles are not designed to have a sufficient width to have three ISS seats in a non-first row application.

Thus, there remains a significant need for a split seat back that can have headrests for each occupant of the seat including a center position occupant wherein the split seat back portions can be operated without the necessity of removing the center headrest. Further, there remains a need to provide an automotive split bench seat having adjustable headrests for each occupant of the seat including a center occupant and the split seat back portions can be operated without the necessity of removing a headrest.

Even further, there remains a need to provide a split seat back having a non-rotating headrests for each occupant of the seat including a center occupant and the split seat back portions can be operated without the necessity of removing a headrest.

SUMMARY OF THE INVENTION

A feature of the present is the provision of a cantilevered headrest for use in a center position of a non-first row, vehicle seating application having a split seat back.

An additional feature of the present invention is the provision of a cantilevered headrest for use in a center position of vehicle seating application having a split seat back wherein the cantilevered headrest is height adjustable.

An additional feature of the present invention is the provision of a cantilevered headrest for use in a center position of vehicle seating application having a split seat back wherein the cantilevered headrest is non-rotatable.

One embodiment of the present invention relates to the provision of a cantilever supported headrest in a vehicle seat. The cantilever supported headrest is preferably provided for a middle occupant position for a non-first row vehicle seat application such as the middle occupant position in bench seat or the like having a 50-50 or 60-40 split bench seat having first and second seat back portions. The cantilever supported headrest is preferably provided on one of the first and second split seat backs and includes a tube having a height adjustment feature and a headrest member including a headrest support frame covered by a cushion and finish material.

The headrest support frame preferably has a first side designed to face the seat occupant and a second side having a substantially rectangular shape designed to face away from the occupant. The headrest support frame preferably includes two portions welded together and a flange along a peripheral side edge of the second side of the headrest support frame.

The tube is preferably shaped in a substantially rectangular shape to correspond with the rectangular shape of the second side of the headrest support frame so that the end of the tube is aligned with the flange and can be welded thereto.

In one embodiment of the present invention, the tube further includes a passage at one end of the tube. The passage preferably consists of a pair of longitudinally extending slots aligned on opposite sides of the tube. In a further embodiment of the present invention, the cantilever supported headrest further includes a three sided support bracket having a pair of aligned passages for the tube to pass through and an anti-rotation bracket having a substantially u-shaped configuration having a leg section located in the passage in the tube to prevent the tube from rotating. An anti-rotation clip having a substantially u-shaped configuration including a pair of side members located on the middle section of the u-shaped anti-rotation bracket and located in the passage of the tube to eliminate buzz, squeaks and rattle problems between the interface of the tube and the anti-rotation bracket. The anti-rotation clip is preferably made of a polymeric material.

It is desirable to provide an automotive seat that provides one or more of these or other advantageous features. Other features and advantages will be made apparent from the following description. The teachings disclosed extend to those embodiments that fall within the scope of the appended claims, regardless of whether they accomplish one or more of the aforementioned needs.

DETAILED DESCRIPTION OF THE PREFERRED EMBODIMENTS

Figure 1:
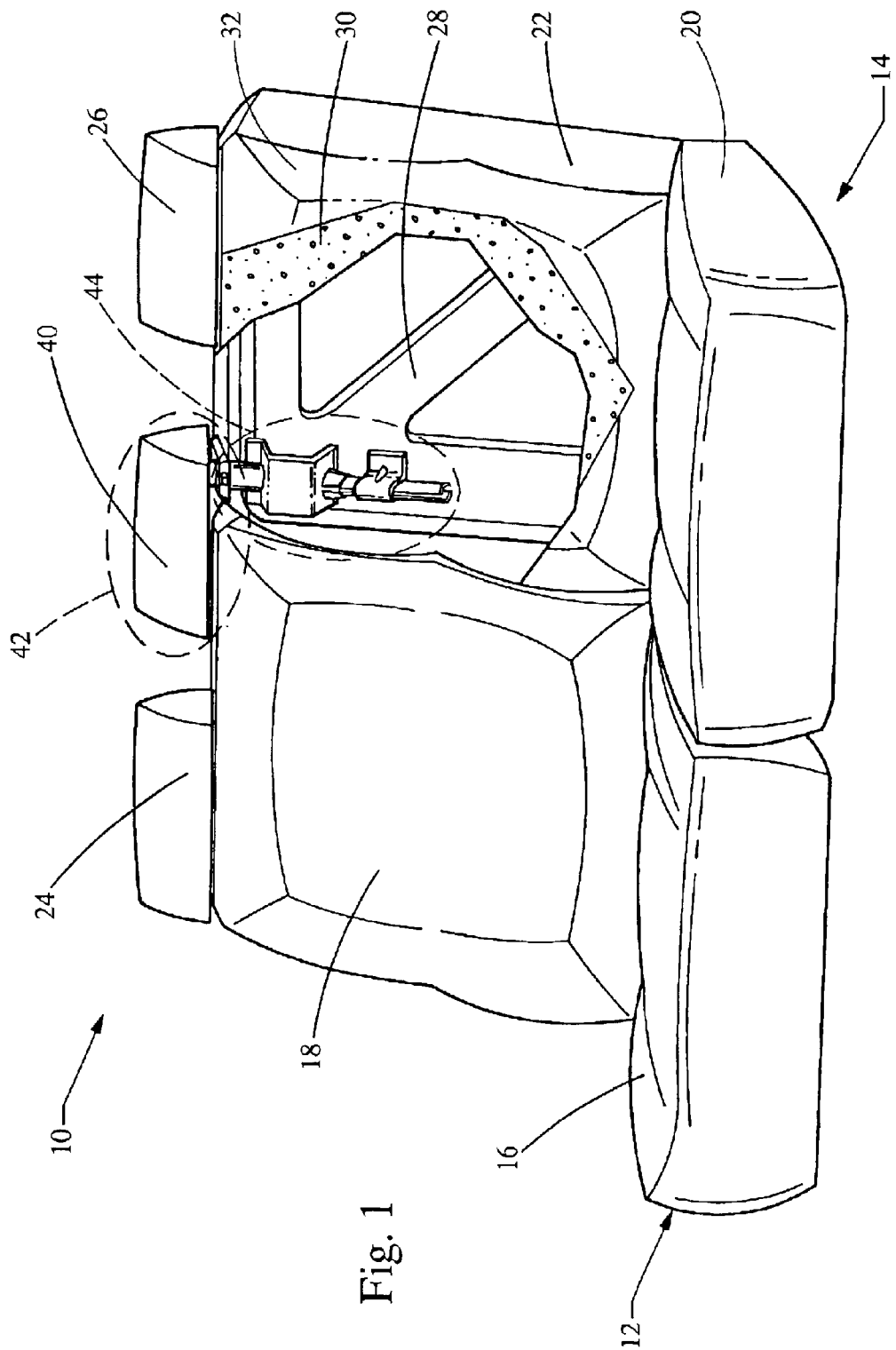
FIG. 1 is a partial sectional, perspective view of a split bench vehicle seat including a cantilever supported headrest according to the present invention.
Figure 2:
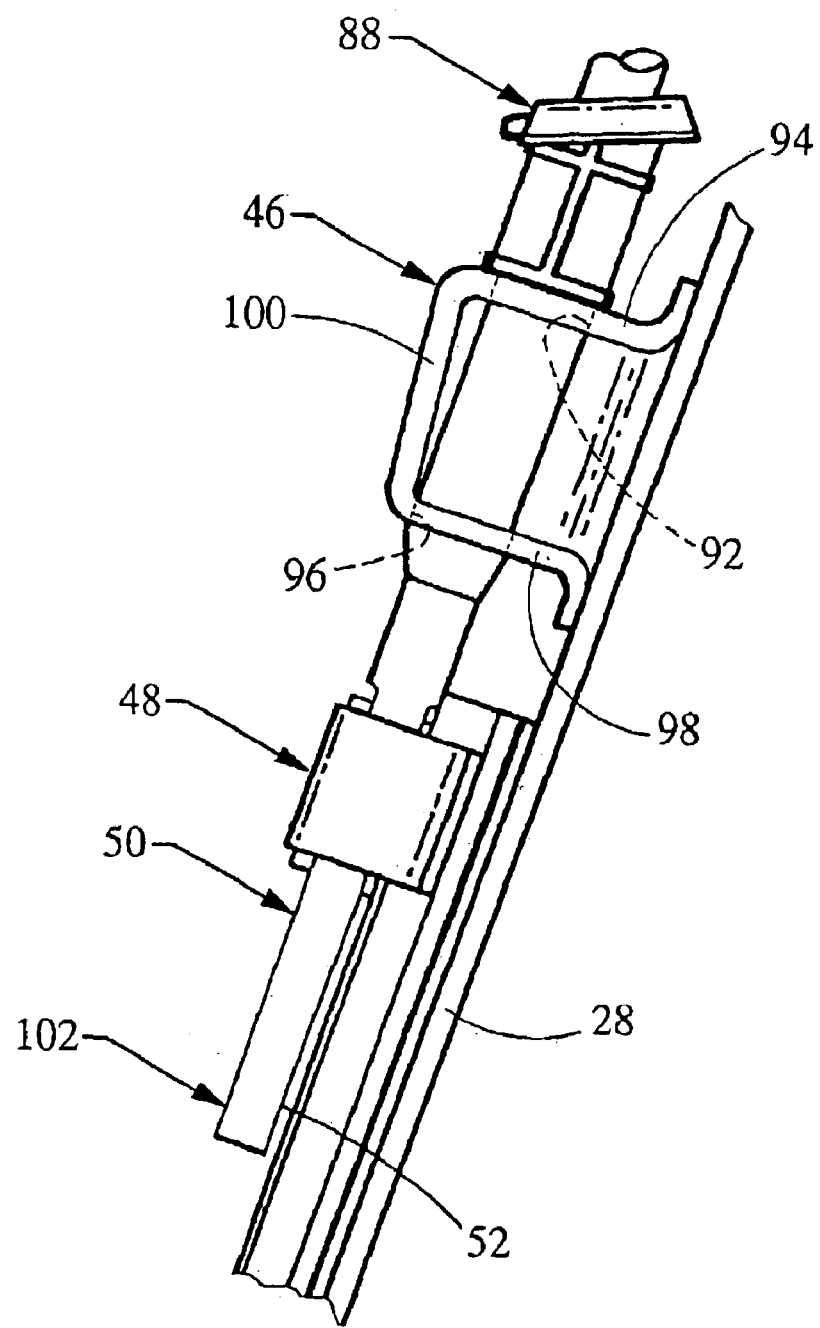
FIG. 2 is a partial side view of the cantilever supported headrest of FIG. 1.
Figure 3:
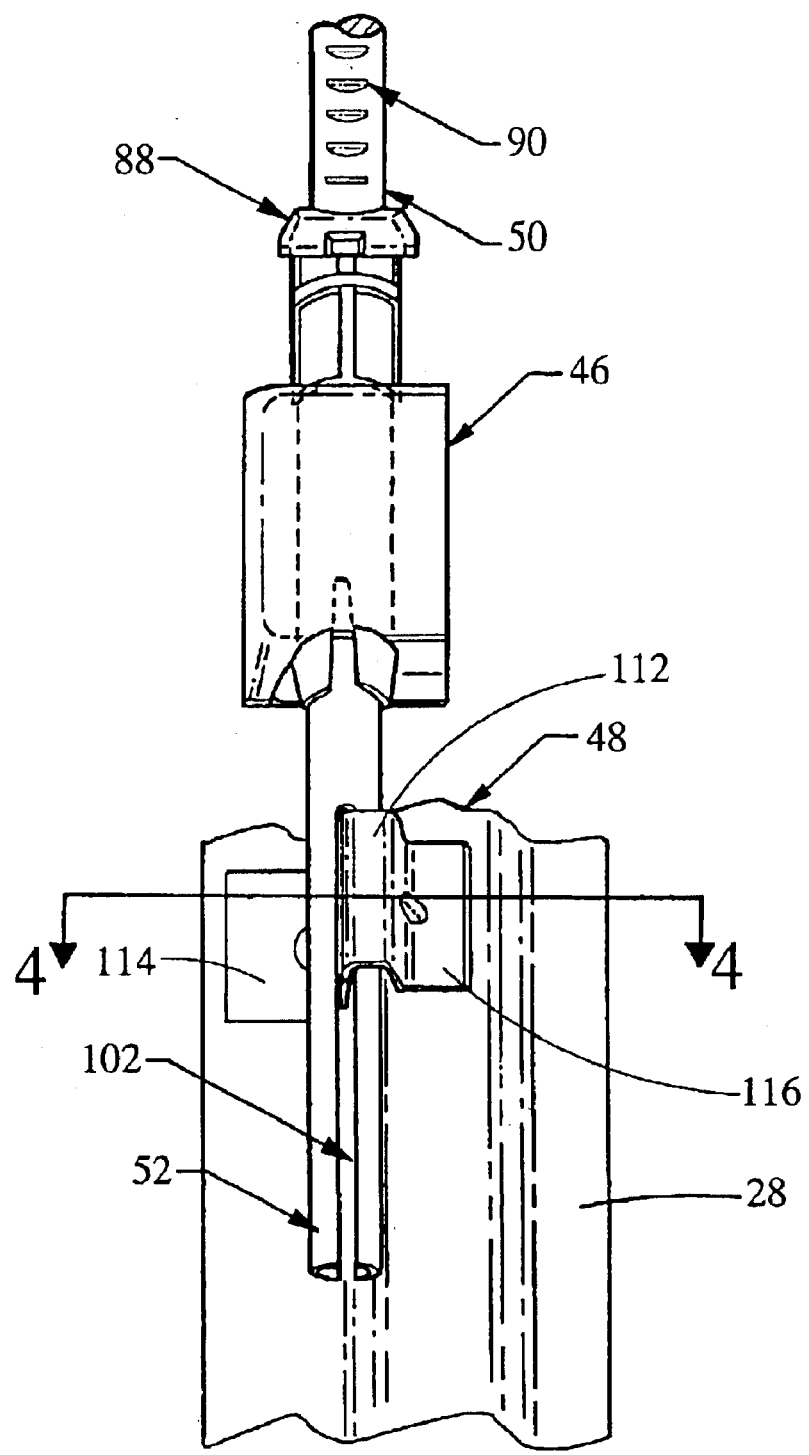
FIG. 3 is a partial front view of the cantilever supported headrest of FIG. 1.
Figure 4:
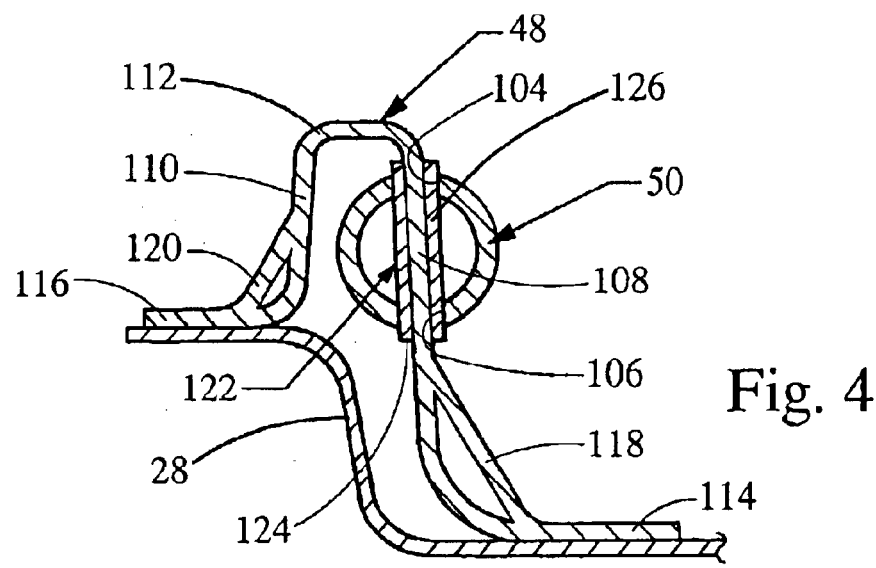
FIG. 4 is a sectional view of the anti-rotation bracket of the cantilever supported headrest according to the present invention taken along the line 4—4 in FIG. 3.

Referring generally to FIGS. 1 through 6 there is shown a vehicle seat 10 in the form of a 50-50 split bench seat having a first seat 12 and a second seat 14. The first seat 12 includes a first seat base 16 and a first seat back 18. Similarly, the second seat 14 includes a second seat base 20 and a second seat back 22. The first seat 12 preferably includes a headrest 24 and the second seat 14 preferably includes a headrest 26. The headrests 24 and 26 are aligned with first and second occupant positions of the vehicle seat 10 and are preferably made using any known or appropriate headrest support design.

The first and second seats 12 and 14, respectively, are preferably made of any known or appropriate construction. By way of example only, with reference to the second seat back 22, there is shown a seat back frame 28 having any known or appropriate construction. The seat back frame 28 is preferably covered by any known or appropriate type of a foam layer 30 and a finish material layer 32 as is known.

A cantilever supported headrest 40 according to the present invention includes a headrest support member 42 and a support and adjustment member 44. The support and adjustment member 44 connects the cantilever supported headrest 40 to the seat back frame 28.

The cantilever supported headrest 40 further includes a support bracket 46 connected to the seat back frame 28, an anti-rotation bracket 48 and a tube 50. The support bracket 46 is preferably positioned toward the top of the seat back frame 28 and has a substantially three-sided shape design and provides the tube 50 with substantial support against loads applied to the head support member 42. The support bracket 46 is preferably formed from a high strength material such as steel and is preferably welded to the seat back frame 28. However, it should be understood that any known or appropriate material may be used for the support bracket 46 and it is preferably made from the same material as the seat back frame 28. The anti-rotation bracket 48 is preferably positioned below the support bracket 46 and is also preferably attached to the seat back frame 28 and is made of a similar material as the support bracket 46 and is also attached using any known or appropriate attachment or connection device, such as a weld, as long as it maintains the attachment of the support bracket 46 to the seat back frame 28 under the substantial load conditions that are common for head rest applications and which are increased due to the cantilever supported nature of the present design.

The tube 50 is preferably made to have a designed construction. The tube 50 has a generally circular cross section and is made from a high strength steel and is finished appropriately using any known or suitable manufacturing and finishing techniques. The tube 50 has a first end 52 connected to the anti-rotation bracket 48 and a second end 54 located distal from the first end 52 for connection with the headrest support member 42. The second end 54 is preferably shaped into a substantially rectangular shape to substantially correspond the headrest support member 42 to provide an appropriate connection.

The end 54 of the tube 50 includes a first portion 56 extending horizontally and aligned with a top portion 58 of the headrest support member 42. A second portion 60 of the tube 50 extends downward from the first portion 56 at an angle offset from vertical along a side portion 62 of the headrest support member 42. The tube 50 then has a third portion 64 extending substantially parallel to the first portion 56 along a bottom portion 66 of the headrest support member 42 and terminating at an ultimate end point 68.

Figure 5:
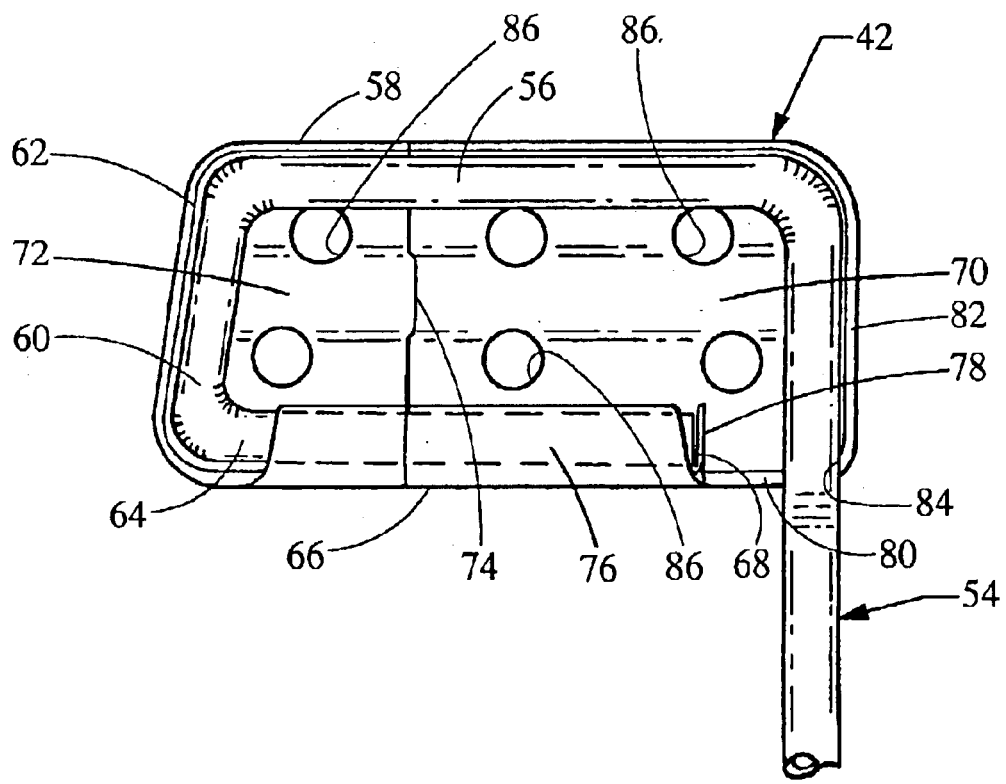
FIG. 5 is a partial rear view of the cantilever supported headrest according to the present invention showing the detail of the connection between the tube and a headrest support frame.
Figure 6:
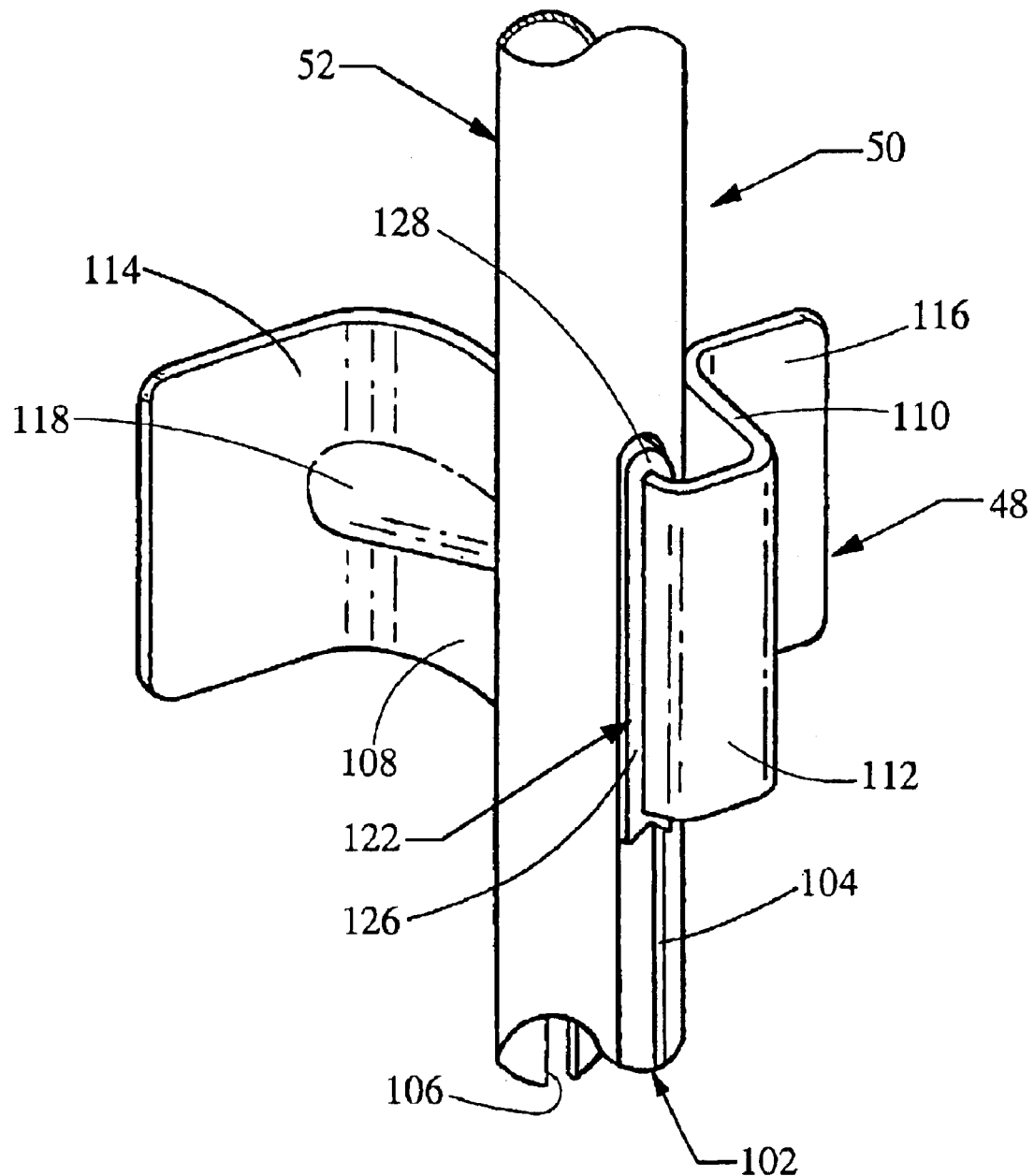
FIG. 6 is a partial perspective view of the of a headrest support frame according to the present invention showing the detail of the connection between the tube and the anti-rotation bracket and anti-rotation clip.

As best shown in FIG. 5, the headrest support member 42 includes a first half 70 and a second half 72 which are connected along a seam 74. The seam 74 preferably has a scalloped, wavy or sinusoidal shape forming the connection between the first and second halves 70 and 72 to help in making certain the two halves are properly aligned. The first and second halves 70 and 72 are then preferably, permanently connected together by welding along the seam 74.

The bottom portion 66 of the headrest support member 42 further includes a first tab 76 extending in a direction toward the first portion 58 of the headrest support member 42 to capture the third portion 64 of the end 54 of the tube 50. The first tab 76 preferably extends across the seam 74 such that the first tab 76 includes two portions.

The headrest support member 42 further includes a second tab 78 as part of the bottom portion 66 aligned to abut with the ultimate end 68 of the tube 50. The second tab 78 also extends in a direction toward the first portion 58 of the headrest support member 42 but the second tab 78 is preferably aligned substantially perpendicular with the first tab 76. As the second tab 78 is taken form the bottom portion 66 of the first half 70 of the headrest support member 42, it creates a hole 80 which extends from the second tab 78 toward a second side portion 82 arranged opposite the side portion 62. The hole 80 is further defined by an end 84 located toward the bottom portion 66 of the second side portion 82 of the first half 70 of the headrest support member 42. The headrest support member 42 further includes a plurality of holes 86 designed to lighten the weight of the headrest support member 42 while still providing substantial support to a seat occupant.

Further, it has been found that it is particularly advantageous to have the tube 50 designed such that it's thickness is not substantially less than 0.13 times the diameter for a high strength low alloy steel or any comparable material having a minimum yield strength of approximately at least 345 MPa. Alternatively, it is stated that the tube 50 has a diameter to thickness ratio of approximately greater than or equal to 7.62. Further, if the tube 50 is of the variety having a seam or weld (such as an electronically welded seam), the seam is preferably located opposite the plurality of adjustment notches 90.

The support and adjustment member 44 also includes an adjustment mechanism 88 as is well known for adjusting the height of a headrest such as the cantilever supported headrest 40. The adjustment mechanism 88 preferably interacts with a plurality of notches or holes 90 aligned longitudinally on the tube 50. The adjustment mechanism 88 is connected to the support bracket 46 and preferably passes through a passage in the support bracket 46, the passage including a first hole 92 located on a first side 94 and a second hole 96 located in a second side 98. The support bracket 46 further includes a third side 100 extending between the first and second sides 94 and 98, respectively, such that the support bracket 46 forms a substantially three-sided figure having the adjustment mechanism 88 passing there through and the tube 50 also passes through the first and second holes 92 and 96, respectively. The support bracket 46 is preferably connected to the adjustment mechanism 88 and the tube 50 at a point between the first end 52 and the second end 54 of the tube 50.

The support and adjustment member 44 further includes the anti-rotation bracket 48. The anti-rotation bracket 48 is connected or combined with the tube 50. The tube 50 includes a includes a passage 102 extending longitudinally along a given length of the first end 52 of the tube 50. The passage 102 preferably extends upward from the first end 52 to allow the anti-rotation bracket 48 to be inserted into the passage 102. The passage 102 includes a first slot 104 aligned toward one side of the tube 50 and a second slot 106 preferably aligned opposite the first slot 104 such that the first and second slot 104 and 106, respectively, are preferably aligned along a diagonal of the tube 50.

The anti-rotation bracket 48 has a substantially u-shaped configuration designed for connection with the seat back frame 28. The u-shaped portion of the anti-rotation bracket 48 includes a first leg 108 having a first length, a second leg 110 having a second length and a middle portion 112 interconnecting the first leg 108 and the second leg 110. The anti-rotation bracket 48 further preferably includes a first attachment portion 114 extending from the first leg 108 and a second attachment portion 116 extending from the second leg 110. The first and second extension portions 114 and 116, respectively, preferably extend in directions substantially perpendicular to the first and second legs 108 and 110, respectively and are aligned with respective portions of the back frame 28 so the so the first and second extension portions 114 and 116, respectively, may be welded with the back frame 28. In one preferred embodiment the first leg 108 is longer than the second leg 110 to allow the anti-rotation bracket 48 to be connected to a stepped portion of the back frame 28.

The anti-rotation bracket 48 further preferably includes a first rib 118 extending between the first leg 108 and the first extension portion 114 to reinforce the anti-rotation bracket to help it carry more loads applied through the tube 50. Similarly, the anti-rotation bracket 48 further preferably includes a second rib 120 extending between the second leg 110 and the second extension portion 116 to further reinforce the anti-rotation bracket to help it carry more loads applied through the tube 50. In view of and consistent with the description above, the anti-rotation bracket 48 is preferably made as a unitary piece using a stamping forming technique. Alternatively, the anti-rotation bracket 48 may be made using other known forming techniques without departing from the broader aspects of the present invention.

The cantilever headrest 40 of the present invention further includes an anti-rotation sleeve or clip 122 having a substantially u-shaped configuration including a first leg 124 and a second leg 126. The first leg 124 and second leg 126 are connected together through a middle portion 128. The anti-rotation sleeve 122 is connected to the first leg 108 of the anti-rotation bracket 48 and is located in the passage 102 of the tube 50. The anti-rotation sleeve 122 is preferably made from a nylon material or similar plastic material to provide an appropriate level of compliance between the anti-rotation bracket 48 and the tube 50 while preventing any squeaks and rattles that would result from having the metal of the anti-rotation bracket 48 interact directly with the metal of the tube 50.

The anti-rotation bracket 48 further preferably includes a tab 130 (not shown) for interaction with a notch 132 located in the center of the middle portion 128. The notch 132 locates the anti-rotation sleeve 122 on the anti-rotation bracket 48 and prevents the anti-rotation sleeve 122 from moving on the anti-rotation bracket 48.

While the drawings and examples describe herein include various exemplary embodiments, they only serve the purpose of illustrating one preferred embodiment the invention. The inventions disclosed are not limited to the specific forms shown. The systems and methods depicted and described are not limited to the precise details and conditions disclosed. Furthermore, other substitutions, modifications, changes, and omissions may be made in the design, operating conditions, and arrangements of the exemplary embodiments without departing from the scope of the invention as expressed in the appended claims.

What is claimed is:

1. A cantilever supported headrest for connection to a seat back having a back frame for use in a vehicle, the headrest comprising:

a tube having a first end having a passage therein and a second end located distal from the first end;

the tube includes a first slot located in a side of the tube and extending a predetermined distance of the longitudinal length of the tube, and a second slot located in a side of the tube opposite the first slot and extending from the first end a predetermined distance of the longitudinal length of the tube;

a headrest support frame connected to the second end of the tube;

a support bracket for connection with the back frame of the seat back, the support bracket having a passage there through, the tube passing through the passage of the support bracket; and an anti-rotation bracket for connection with the back frame of the seat back, the anti-rotation bracket located in the passage in the tube.

2. The headrest of claim 1, wherein the support bracket comprises a first planar surface spaced from the tube, a second surface having a passage therein and a third surface having a passage therein and aligned with the passage of the second surface, the tube passing through the passage in the second surface and the passage in the third surface and further wherein the passage in the tube includes a first slot located in a side of the tube and extending a predetermined distance of the longitudinal length of the tube, and a second slot located in a side of the tube opposite the first slot and extending from the first end a predetermined distance of the longitudinal length of the tube.

3. The headrest of claim 1, further comprising an anti-rotation clip having a first member and a second member spaced distal from the first member, the anti-rotation bracket being located between the first and second members and the anti-rotation clip being located in the passage in the tube; and further comprising a headrest support frame connected to the second end of the tube, the headrest support frame having a front side facing toward an occupant and a back side aligned in a direction away from the seat occupant, the back side having a substantially rectangular shape including flange located on a lower peripheral side thereof; wherein the second end of the tube has a substantially rectangular shape such that the second end of the tube is aligned with and terminates along the flange of the headrest support frame.

4. A cantilever supported headrest for connection to a seat back having a back frame for use in a vehicle, the headrest comprising:

a tube having a first end having a passage therein and a second end located distal from the first end;

a headrest support frame connected to the second end of the tube, the headrest support frame comprising a first half and a second half, the second half matingly engaging the first half, the headrest support frame having a flange located on one peripheral side thereof;

a support bracket for connection with the back frame of the seat back, the support bracket having a passage there through, the tube passing through the passage of the support bracket;

an anti-rotation bracket for connection with the back frame of the seat back, the anti-rotation bracket located in the passage in the tube; and an anti-rotation clip having a first member and a second member spaced distal from the first member, the anti-rotation bracket being located between the first and second members and the anti-rotation clip being located in the passage in the tube; wherein the second end of the tube has a substantially rectangular shape and aligned with the flange located on the headrest support frame.

5. The headrest of claim 4, wherein the headrest support frame has a front side to be aligned facing an occupant and a back side to be aligned in a direction facing away from the seat occupant, the back side having a substantially rectangular shape corresponding to the substantially rectangular shape of the second end of the tube.

6. The headrest of claim 5, wherein the headrest support frame engages the tube and is welded to the tube along the flange.

7. A vehicle seat having a split seat back defining first and second seat backs each having a seat back frame, the vehicle seat and having first, second and middle occupant positions each having a headrest, the middle occupant position having a cantilever supported headrest having a tube connected to the first seat back, the cantilever supported headrest comprising:

the tube having a first end having a passage therein and a second end located distal from the first end;

a headrest support frame connected to the second end of the tube, the headrest support frame comprising a first half and a second half, the second half matingly engaging the first half, the headrest support frame having a flange located on one peripheral side thereof;

a support bracket for connection with the seat back frame of the first seat back and supporting the tube;

an anti-rotation bracket for connection with the back frame of the first seat back, the anti-rotation bracket located in the passage in the tube; and an anti-rotation clip connected to the anti-rotation bracket; and wherein the anti-rotation bracket is located between the first and second members and the anti-rotation clip is located in the passage in the tube; wherein the second end of the tube has a substantially rectangular shape aligned with the flange located on the headrest support frame.

8. The headrest of claim 7, wherein the headrest support frame has a front side aligned toward an occupant and a back side aligned toward a direction facing away from the seat occupant, the back side of the head support frame having a substantially rectangular shape corresponding to the substantially rectangular shape of the second end of the tube.

9. The headrest of claim 8, wherein the headrest support frame engages the tube and is welded to the tube along the flange.

10. The headrest of claim 7, wherein the tube has a thickness not substantially less than 0.18 times the diameter of the tube.

* * * * *